United States Patent
Kates et al.

(10) Patent No.: US 10,099,579 B2
(45) Date of Patent: Oct. 16, 2018

(54) GOLF CART WITH MOVABLE SEAT INCLUDING A SEAT SWIVEL MECHANISM

(71) Applicants: Kaitlin Kates, Atlanta, GA (US); TreVorski Garrett, Atlanta, GA (US); Jeffrey Pettyjohn, Rockmart, GA (US); Douglas Wisser, Bainbridge Island, WA (US); Brian Leach, Atlanta, GA (US); Joshua Newton, Powder Springs, GA (US)

(72) Inventors: Kaitlin Kates, Atlanta, GA (US); TreVorski Garrett, Atlanta, GA (US); Jeffrey Pettyjohn, Rockmart, GA (US); Douglas Wisser, Bainbridge Island, WA (US); Brian Leach, Atlanta, GA (US); Joshua Newton, Powder Springs, GA (US)

(73) Assignee: Chiari & Syringomyelia Foundation, Inc., Staten Island, NY (US)

( * ) Notice: Subject to any disclaimer, the term of this patent is extended or adjusted under 35 U.S.C. 154(b) by 0 days.

(21) Appl. No.: 14/959,796

(22) Filed: Dec. 4, 2015

(65) Prior Publication Data
US 2016/0159255 A1 Jun. 9, 2016

Related U.S. Application Data

(60) Provisional application No. 62/087,235, filed on Dec. 4, 2014.

(51) Int. Cl.
*B60N 2/24* (2006.01)
*B60N 2/14* (2006.01)
*B60N 2/16* (2006.01)

(52) U.S. Cl.
CPC .............. *B60N 2/245* (2013.01); *B60N 2/14* (2013.01); *B60N 2/16* (2013.01)

(58) Field of Classification Search
CPC ............. B60N 2/245; B60N 2/14; B60N 2/16
See application file for complete search history.

(56) References Cited

U.S. PATENT DOCUMENTS

| | | | |
|---|---|---|---|
| 4,019,602 A | 4/1977 | Habiger | |
| 4,792,188 A | 12/1988 | Kawashima | |
| 5,110,184 A | 5/1992 | Stein et al. | |
| 5,341,894 A * | 8/1994 | Van Gorder, Jr. | B60K 28/10 180/271 |
| 5,727,042 A | 3/1998 | Brenneisen | |
| 5,732,788 A | 3/1998 | Brown | |
| 5,950,751 A | 9/1999 | McComber | |
| 6,231,067 B1 | 5/2001 | Johnson et al. | |
| 6,250,717 B1 | 6/2001 | Porcheron | |
| 6,578,854 B2 | 6/2003 | Wucherpfennig et al. | |
| 2003/0019684 A1 * | 1/2003 | Wucherpfennig | A63B 71/0009 180/330 |

(Continued)

*Primary Examiner* — D Glenn Dayoan
*Assistant Examiner* — Melissa A Black
(74) *Attorney, Agent, or Firm* — The Farrell Law Firm, P.C.

(57) ABSTRACT

A golf cart is provided. The golf cart includes a first seat and a second seat that is connected to the first seat and the golf cart. The second seat is movable relative to the first seat and the golf cart from a first configuration to a second configuration for moving a user of the second seat outwardly and upwardly from the golf cart from a driving position to a golfing position.

15 Claims, 7 Drawing Sheets

(56) References Cited

U.S. PATENT DOCUMENTS

2004/0169411 A1* 9/2004 Murray ............... B60R 22/105
 297/486
2013/0173099 A1* 7/2013 Takagi ............... B60W 10/08
 701/22

* cited by examiner

GOLF CART WITH MOVABLE SEAT INCLUDING A SEAT SWIVEL MECHANISM

PRIORITY

This application claims priority under 35 U.S.C. § 119(e) to U.S. Provisional Patent Application Ser. No. 62/087,235, which was filed on Dec. 4, 2014, the entire disclosure of which is incorporated herein by reference.

BACKGROUND OF THE INVENTION

1. Field of the Invention

The present invention relates generally to a golf cart, and more particularly, to a golf cart with a movable seat including a seat swivel mechanism.

2. Description of the Related Art

Handicap accessible golf carts are known. Typically, such golf carts include a three or four-wheeled design and a restraint system that is configured to secure a handicapped or disabled golfer to a swivel chair, which upon actuation, places the disabled golfer in an optimal position for taking a golf swing.

While the above-mentioned golf carts may provide a safe and comfortable environment for adult golfers with disabilities, such golf carts are, typically, are not configured to provide the same safe and comfortable environment for child golfers with disabilities.

To accommodate disabled children, most conventional golf carts come with an upgradeable kit that is configured to accommodate the relatively small size of a child. However, such kits are rather expensive, have inadequate restraint systems (e.g., use a single strap or harness), and use booster seats which do not provide adequate leg support and do not address the potential height and depth seat differences between adults and children.

SUMMARY OF THE INVENTION

In view of the above, a golf cart with a movable seat including a seat swivel mechanism for use by children golfers may prove useful in the golf industry.

In accordance with an aspect of the present invention, there is provided a golf cart. The golf cart includes a first seat and a second seat that is movable relative to the first seat and the golf cart from a first configuration to a second configuration for moving a user of the second seat outwardly and upwardly from the golf cart from a driving position to a golfing position.

In accordance with another aspect of the present invention, there is provided a two-passenger golf cart seat that is configured to connect to a golf cart. The golf cart seat includes a first seat and a second seat that is movable relative to the first seat and the golf cart from a first configuration to a second configuration for moving a user of the second seat outwardly and upwardly from the golf cart from a driving position to a golfing position.

BRIEF DESCRIPTION OF THE DRAWINGS

The above and other aspects, features, and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Various embodiments of the present invention will now be described in detail with reference to the accompanying drawings. In the following description, specific details such as detailed configuration and components are merely provided to assist in the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

As described above, a golf cart with a movable seat including a seat swivel mechanism for use by children golfers may prove useful in the golf industry, and such a golf cart is herein described.

Figure 1:
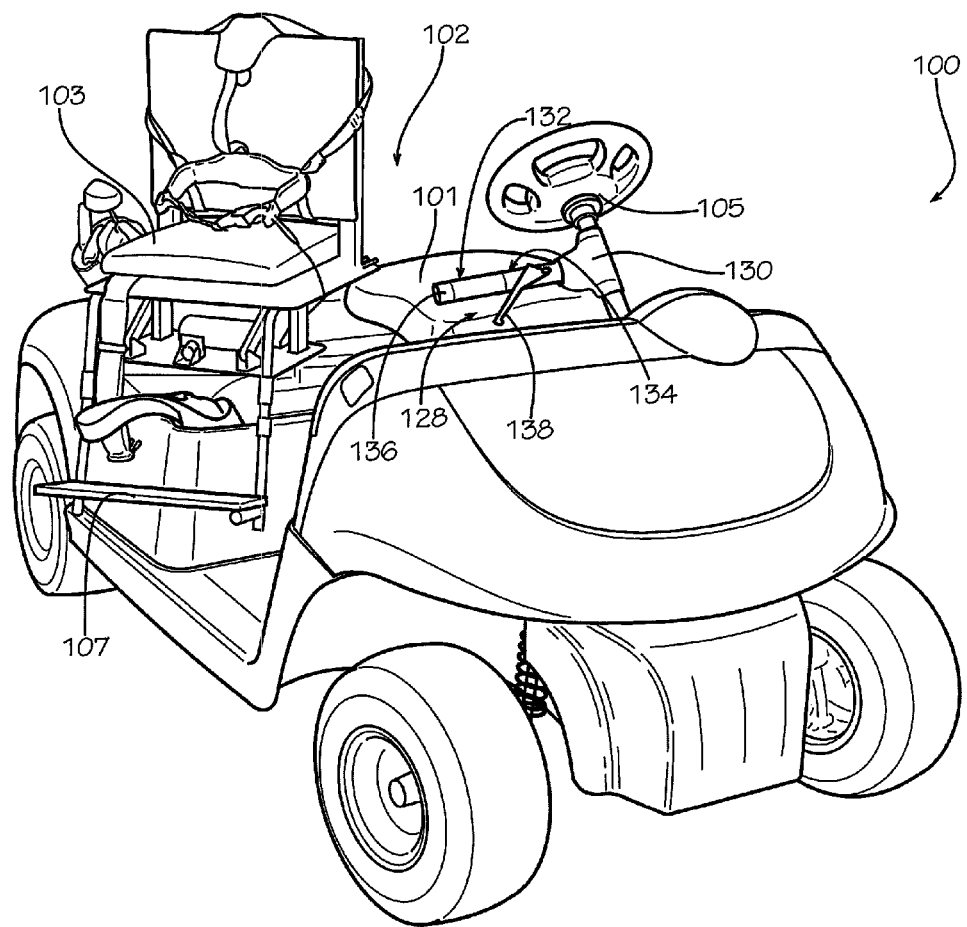
FIG. 1 is perspective view of a golf cart including a two-passenger golf cart seat, according to an embodiment of the present invention.

FIG. 1 is perspective view of a golf cart 100 including a two-passenger golf cart seat 102, which enables disabled children—for example children who do not have use of one or both of their legs—to independently play golf in a safe and secure environment, according to an embodiment of the present invention, thereby providing disabled children with the ability to enjoy sports such as golf and to maintain a healthy and active life. The golf cart seat 102 is mounted to the golf cart 100 via one or more suitable mounting devices; nuts, bolts, rivets, screws, clamps, clasps, and other suitable mounting devices may be used to mount the golf cart seat 102 to the golf cart 100.

The golf seat 102 includes a first seat 101, which is a conventional seat, that allows a user of the first seat 101 to drive the golf cart 100 around a golf course, and a second seat 103, which is configured to transport a user of the second seat 103 around the golf course in a secure, safe manner. When the user of the second seat 103 is ready to take a golf shot, the second seat 103 is also configured to place the user of the second seat 103 in an optimal position to play various golf shots, e.g., drive a golf ball off a tee, putt a golf ball on a green, etc.

Figure 2:
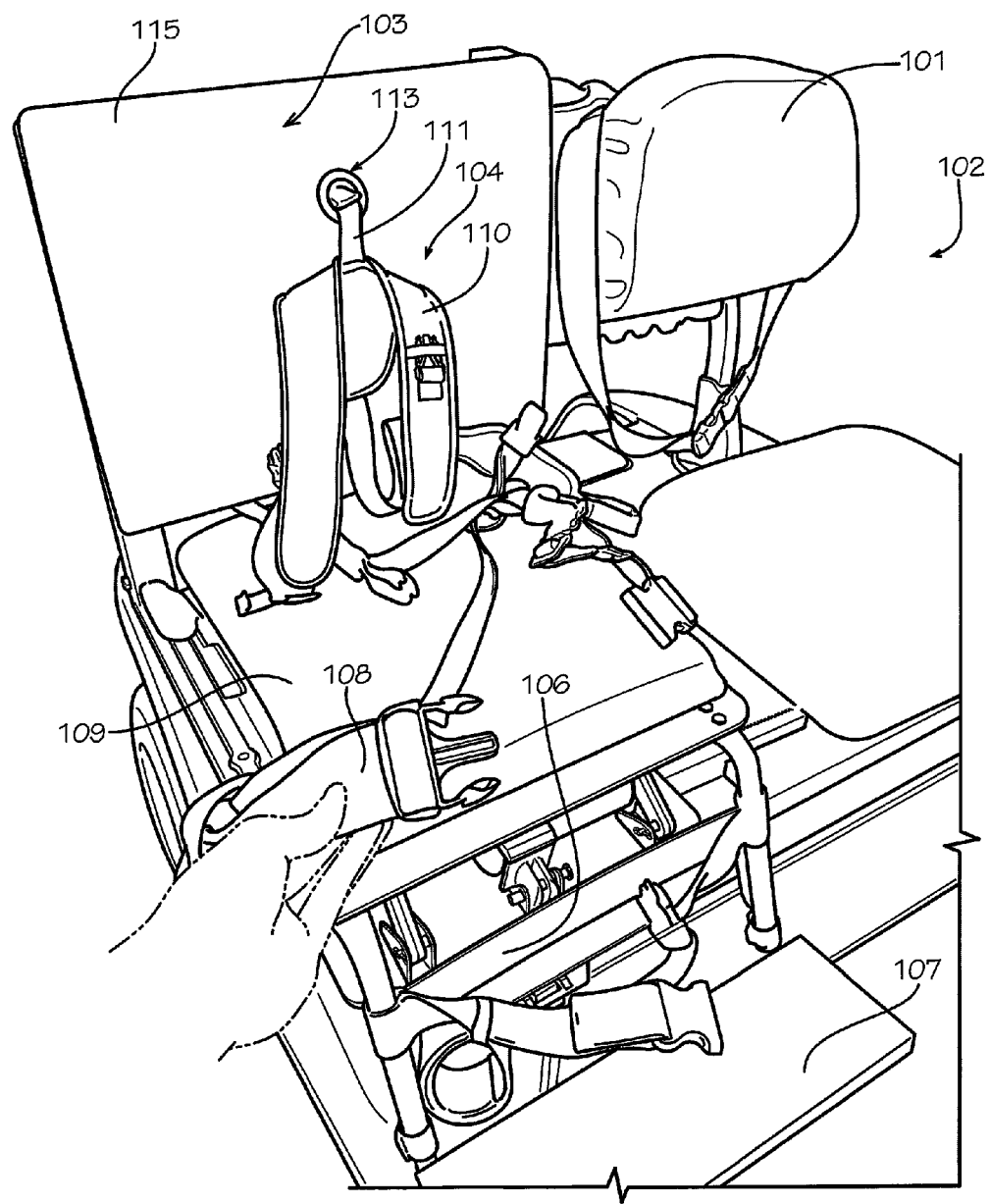
FIG. 2 is a perspective view of the golf cart seat of FIG. 1, according to an embodiment of the present invention.

With reference to FIG. 2, the golf cart seat 102 includes a harness system 104 including a plurality of harnesses which connect to the second seat 103. More particularly, the harness system 104 includes a first harness 106 and a second harness 108 that are configured to secure a user's legs to a lower frame of the second seat 103, and a third harness 110 that is configured to secure a user's torso to a backrest portion 115 of the second seat 103.

With respect to the first harness 106 and second harness 108, the first harness 106 is connected to a footrest 107 of the second seat 103 and is configured to secure a user's shins to the footrest 107. The second harness 108 is connected to a seat portion 109 of the second seat 103 and is configured to secure a user's thighs to the seat portion 109. With respect to the third harness 110, this harness is connected to the backrest portion 115 of the second seat 103.

The first harness 106, the second harness 108 and the third harness 110 can embodied using known various harness configurations including, but not limited to, seat belt harnesses, climbing harnesses, wheelchair basketball harness, etc. For example, the first harness 106 and the second harness 108 can use a seat belt harness configuration, as these harnesses are used to secure a user's legs to the second seat 103, and the third harness 110 can use a climbing harness configuration, as this harness is used to secure a user's torso to the second seat 103. However, other harness configurations are contemplated.

The first harness 106, the second harness 108 and the third harness 110 can be connected to their respective portions of the second seat 103 using known connection devices or methods including, but not limited, clamps, clasps, screws, nuts, bolts, etc. In addition, it is contemplated that two and perhaps all three of the harnesses can be interconnected to allow for a single locking mechanism to lock and release the harnesses.

For added support, a strap 111 is provided on the third harness 110. The strap 111 is positioned through an aperture 113 that is provided on the backrest portion 115 of the second seat 103 and is connected to a back section of the golf cart 100 and/or a back section of the golf cart seat 102 via one or more clamps or clasps.

Figure 3:
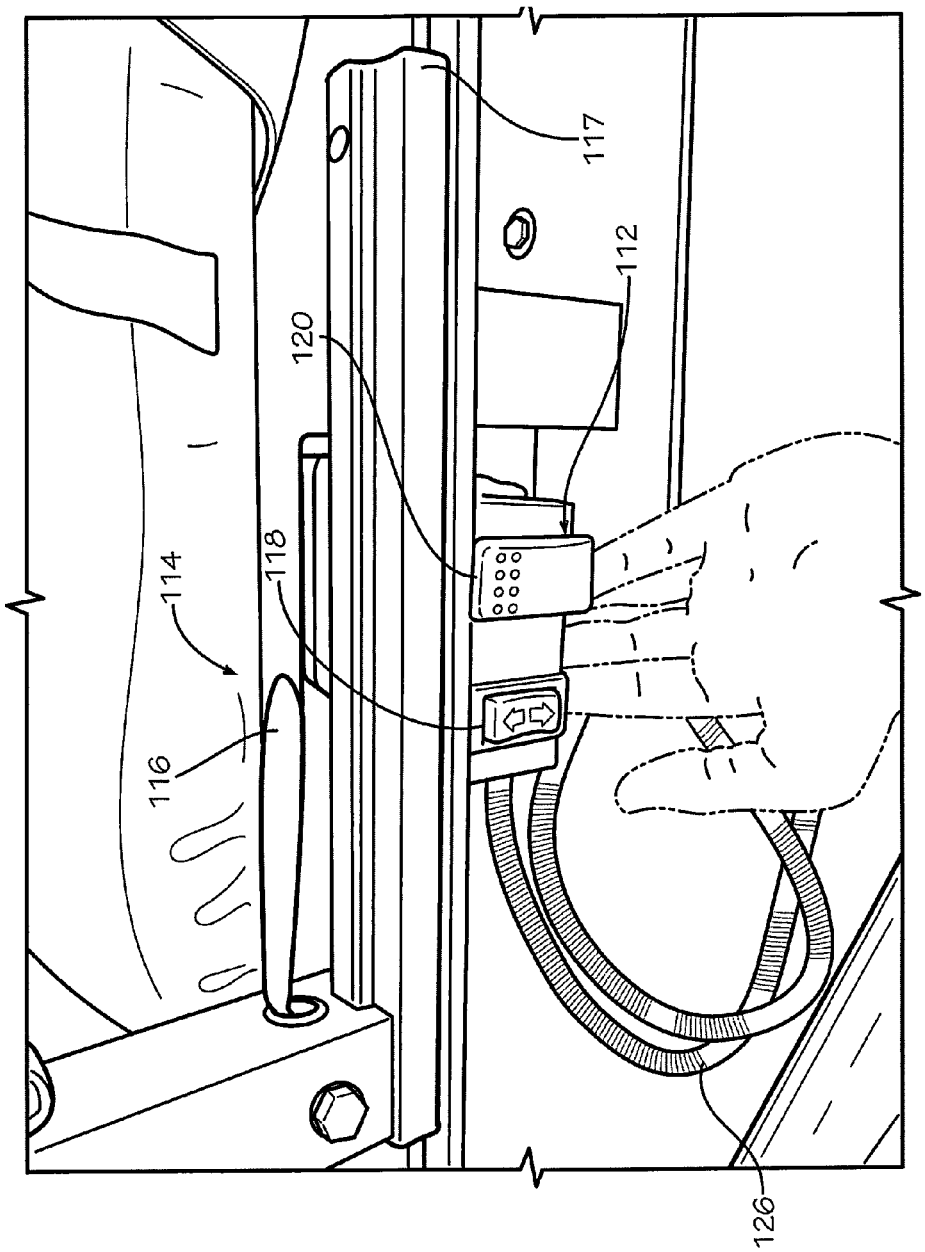
FIG. 3 is a side view of the golf cart seat illustrating an actuation mechanism and an adjustment mechanism, according to an embodiment of the present invention.

Referring to FIG. 3, the second seat 103 includes an actuation mechanism 112 and an adjustment mechanism 114, each of which can be used to move the second seat 103 in one or more directions.

The adjustment mechanism 114 includes a handle 116, which when pulled in an upwardly direction unlocks the second seat 103, allows a user to move the second seat 103 frontwards or backwards within a track 117 to which the second seat 103 is slidably connected. When a desirable position for the second seat 103 is obtained, a user can push the handle 116 in a downwardly direction to lock the seat in the desired position.

The handle 116 of adjustment mechanism 114 is also configured to adjust a height of the second seat 103; however, in this case the handle 116 needs to be moved inwardly and outwardly, as opposed to upwardly and downwardly. More particularly, when the handle 116 is moved outwardly, a pin attached to the handle 116 is moved out of engagement from at least one aperture of a plurality of apertures that are provided on an adjustment rod that extends from a bottom surface of the second seat 103. With the pin disengaged from the at least one aperture, a user can adjust the seat to a desired height, and a user can lock the second seat 103 to the desired height by moving the handle 116 inwardly to engage the pin with at least one other aperture of the plurality of apertures.

Continuing with reference to FIG. 3, the actuation mechanism 112 includes a swivel button 118 and a position button 120.

The swivel button 118, when actuated, moves (e.g., swivels) the second seat 103 from a driving position to a golfing position and vice versa. More particularly, to move the second seat 103 to the golfing position, a user can press an upper arrow on the swivel button 118, and to move the second seat 103 back to the driving position, a user can press a lower arrow on the swivel button 118; however, other button or switch configurations are contemplated, e.g., a toggle switch. It is noted that the second seat 103 rotates about 120 degrees (facing outside of the golf cart 100) outwardly from the driving position; however, the second seat 103 can be configured to rotate less than or greater than 120 degrees. In addition, the switch or button is positively actuated, that is, once the button or switch is released, the swivel of the chair stops.

Figure 7:
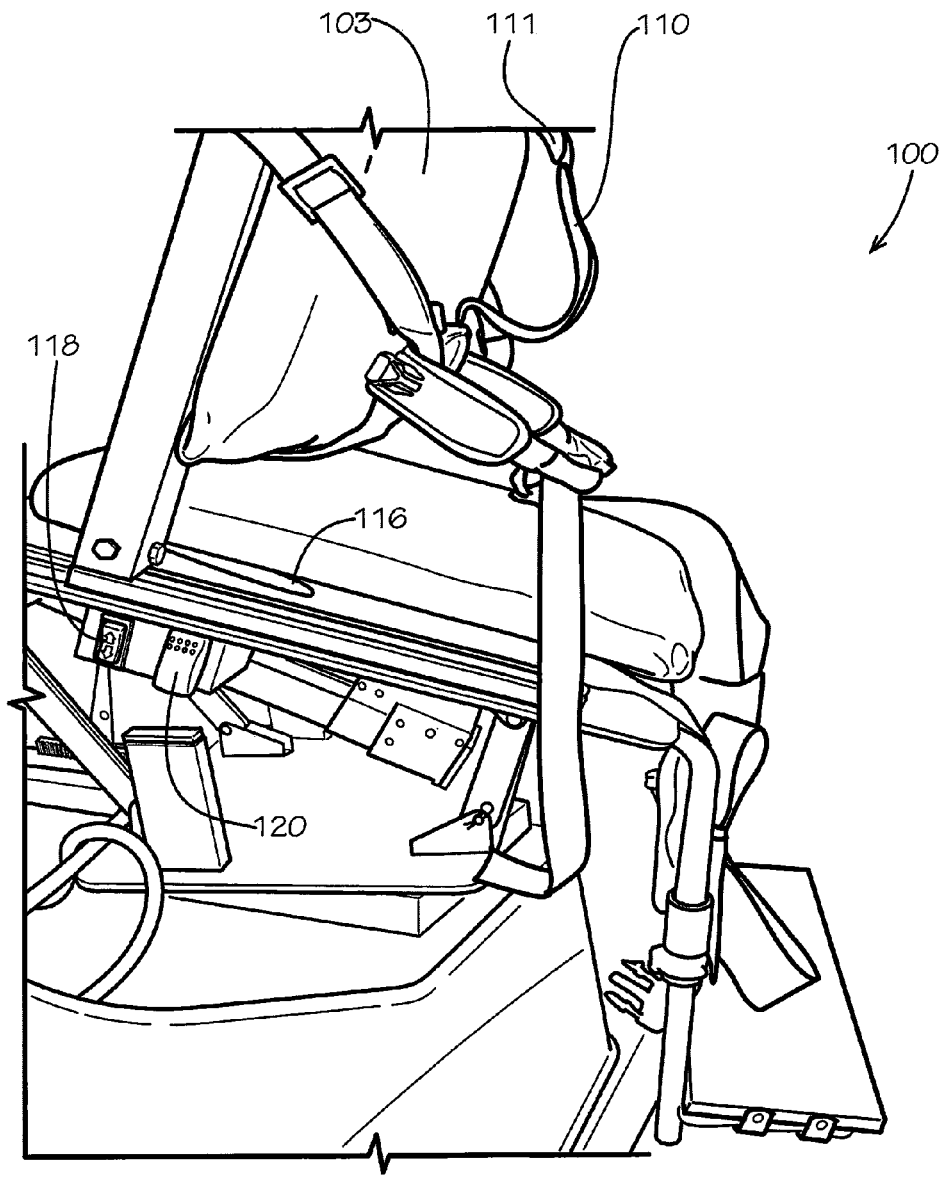
FIG. 7 is a partial, perspective view of the golf cart with the golf cart seat shown in a golfing position, according to an embodiment of the present invention.

In the outwardly rotated configuration, a user can press the position button 120 to lift (i.e., tilt) the second seat 103, and thus a user, upwardly from the driving position to the golfing position so that the user can obtain a proper stance over a golf ball. The position button 120 operates similarly to the swivel button 118, i.e., pressing an upper portion of the swivel button 118 moves the second seat 103 to the golfing position, and pressing the lower portion of the swivel button 118 moves the second seat 103 back to the driving position. It is noted that in the golfing position, the second seat 103 will be tilted to about a 45 degree angle with respect to the driving position (as best seen in FIG. 7); however, the second seat 103 can be configured to tilt less than or greater than a 45 degree angle. In addition, the switch or button is positively actuated, that is, once the button or switch is released, the tilting of the chair stops.

Wires 127 electrically connect the actuation mechanism 112 including the swivel button 118 and the position button 120 to a powered linear actuator 122.

Figure 4:
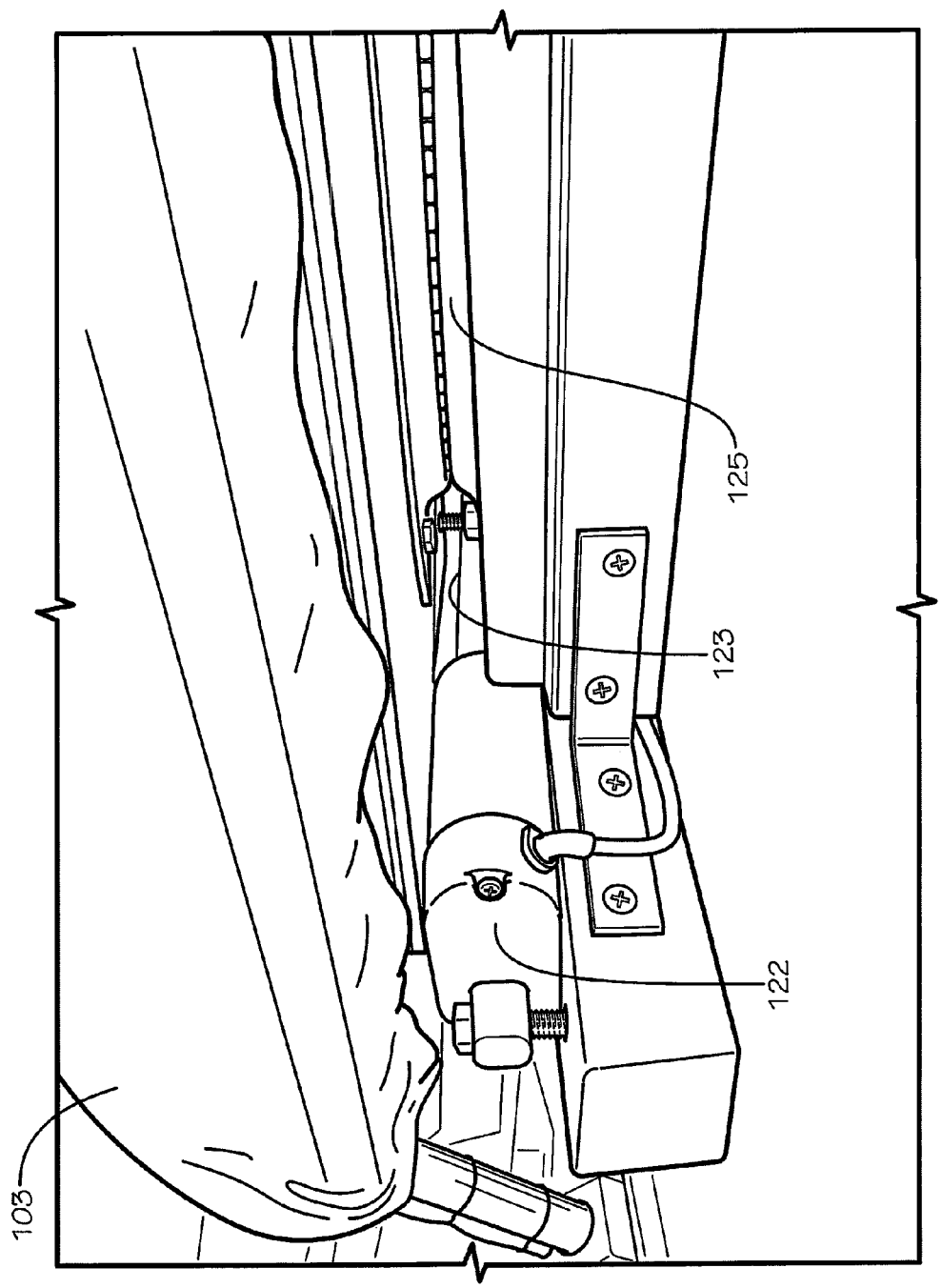
FIG. 4 is a perspective view of a powered linear actuator of the golf cart seat for moving the golf seat from a driving position to a golfing position, according to an embodiment of the present invention.
Figure 5:
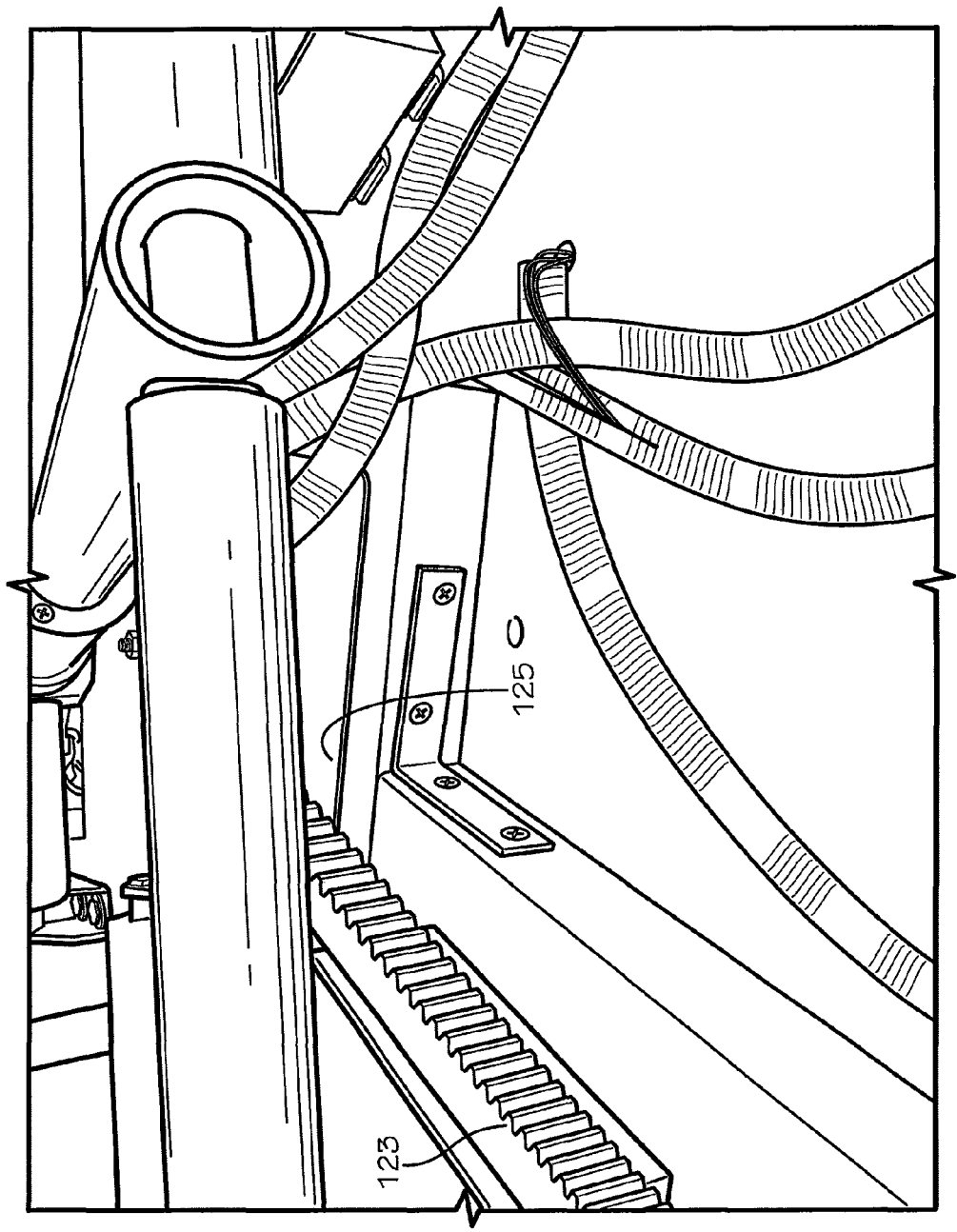
FIG. 5 is a perspective view of a rack and pinion system, which is connected to the power linear actuator of FIG. 4 for moving the golf seat from the driving position to the golfing position, according to an embodiment of the present invention.
Figure 6:
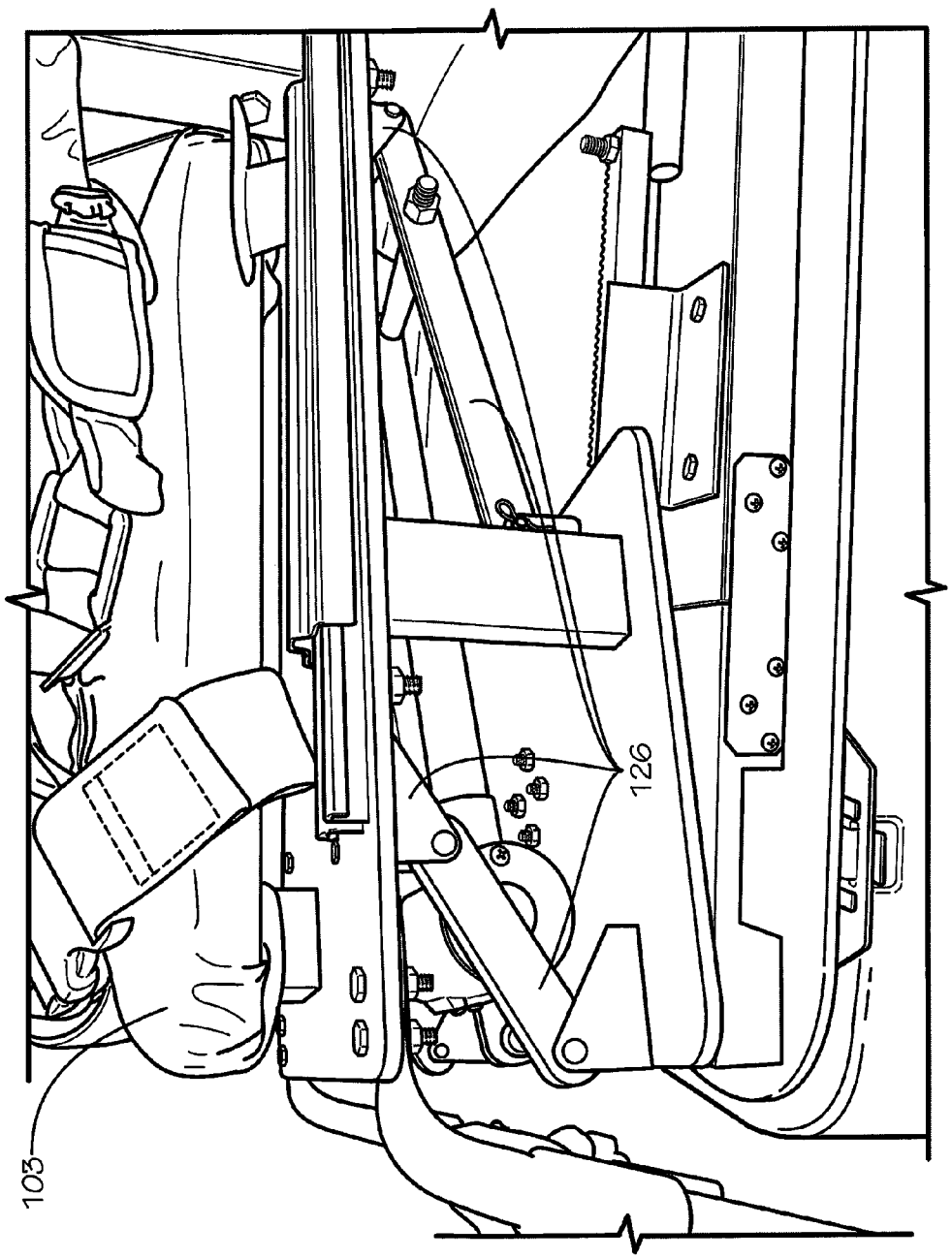
FIG. 6 is a perspective view of a four-bar linkage system, which is connected to the power linear actuator of FIG. 4 for moving the golf seat from the driving position to the golfing position, according to an embodiment of the present invention.

Referring to FIGS. 4-6, the powered linear actuator 122 which connects to a rack 123 and pinion 125 (a gear) system 124 (FIGS. 4 and 5) and a four-bar linkage system 126 (FIG. 6), according to an embodiment of the present invention, is shown.

When a user presses the swivel button 118, the powered linear actuator 122 moves the rack 123, which is attached to the pinion 125, which is attached to a bottom surface of the second seat 103. The linear movement of the rack 123 is translated to rotational motion as the pinion 125 rotates, thereby enabling the second seat 103 to rotate in a manner as described above.

Similarly, when a user presses the position button 120, the powered linear actuator 122, which is also connected to the four bar linkage system 126, moves the four bar linkage system 126, thereby tilting the second seat 103 in a manner as described above.

With reference again to FIG. 1, in addition to a conventional steering wheel 105, the golf cart 100 also includes a handle mechanism 128 that is positioned on a steering wheel 130 column of the golf cart 100. The handle mechanism 128 can be used by a user (e.g., a disabled person, such as an adult accompanying a disabled child, or children whose legs cannot reach the accelerator pedal and brake of the golf cart 100) for controlling movement of the golf cart. With this purpose in mind, the handle mechanism includes a handle 132 which supports thereon a thumb throttle 134, a mode selection switch 136, and a brake handle 138.

The thumb throttle 132 is actuatable by a user and is configured to accelerate and decelerate the golf cart 100. More particularly, the thumb throttle 132 is configured to accelerate the golf cart 100 based on an amount of downward movement of the thumb throttle 132, similar to an operation of a convention accelerator pedal. For example, the farther down a user pushes (or presses) the thumb throttle, the quicker the golf cart 100 will move; deceleration of the golf cart 100 occurs automatically when the thumb throttle 132 is not pushed.

The mode selection switch 136 is configured to place the golf cart 100 in at least two modes of operation, which includes a first mode of operation for traveling from tee to green and a second mode of operation for traveling along cart sensitive areas, such as the green, tee boxes, areas adjacent sand traps, etc. To place the golf cart 100 in the second mode of operation, a user simply pushes the mode selection switch 136 towards the steering wheel 105 and then downwards to lock the mode selection switch 136 in the second mode of operation. In the locked configuration, the mode selection switch 136 is configured to limit the amount of downward movement that can be applied to the thumb throttle 132, thereby preventing a user from excessively accelerating the golf cart 100.

The brake handle 138 can be engaged by pushing it away from the user to stop the golf cart 100; pulling the handle is also contemplated.

As can be appreciated, in addition to the handle mechanism 128, the golf cart 100 can also include conventional golf cart controls (e.g., foot pedals, forward/reverse switches, etc.) for navigating the golf cart 100 around a golf course.

Operation of the golf cart 100 is now described. In the following description, it is assumed that the user of the second seat 103 (the user) is a right handed disabled golfer.

In use, the user can be positioned on the second seat 103 and secured thereto using the harness system 104; to facilitate positioning the user on the second seat 103, the second seat 103 can be positioned as in FIG. 2, or outwardly from the golf cart (see FIG. 1 for example). If need be, the second seat 103 can be adjusted using the handle 116 of the adjustment mechanism 114 to accommodate a particular user, in a manner as described above.

Once the user is secured to the second seat 103, and assuming the user is teeing off, the golf cart 100 can driven to the tee box and positioned adjacent the tee and the ball, with golf cart 100 facing the fairway and green in play. As can be appreciated, if the user is a left handed golfer, the golf cart 100 would be positioned adjacent the tee, but with golf cart 100 facing opposite to the fairway and green in play.

Once the golf cart 100 is in the correct position, the user can press the swivel button 118 to move the second seat 103 including the user outwardly from the driving position, and then the user can press the position button 120 to tilt the second seat 103 including the user to the golfing position. Thereafter, the user can take a golf swing.

The following procedure can be duplicated for the remaining golf shots needed to complete the hole in play, and any remaining holes in the golf round.

The golf cart 100 including the golf seat 102 provides a secure and safe environment for disabled children to play a round of golf and overcomes the aforementioned shortcomings of conventional golf carts that include upgradeable kits for disabled children. That is, the harness system 104 includes multiple harnesses (e.g., harnesses 106, 108, and 110), as opposed to conventional golf seats that include single strap or harness systems, and, thus, an extra layer of safety and stability is provided to the user of the golf cart 100.

Moreover, conventional golf carts use booster seats which do not provide adequate leg support for handicap children, as opposed to the second seat 103 which includes the harness 106 which secures a user's shins to the footrest 107 of the second seat 103 and the harness 108 which secures a user's thighs to the seat portion 109 of the second seat 103.

Additionally, the booster seats used by conventional golf carts do not address the potential height and depth seat differences of disabled children, as opposed to the second seat 103 which includes the adjustment mechanism 114 including the handle 116, which can be used to adjust the second seat 103 to accommodate a particular user.

Furthermore, manufacturing the golf cart 100 with the golf seat 102 is relatively inexpensive when compared to some of the upgrade packages that are typically associated with conventional golf carts.

From the foregoing and with reference to the various figure drawings, those skilled in the art will appreciate that certain modifications can also be made to the present invention without departing from the scope of the same. For example, while the golf cart 100 has been described including the first seat 101 that is configured as a driver seat and the second seat 103 that is configured as a passenger seat, the present invention is not so limited.

For example, the golf cart 100 can be provided with only the second seat 103, which can be positioned on the driver's side of the golf cart 100, as opposed to the passenger's side of the golf cart 100, such as in the case where a golf course allows disabled children over a certain threshold age to drive the golf cart 100. In this particular embodiment, the user can use the handle mechanism 128 to navigate the golf cart 100 around a golf course.

Alternatively, the golf cart 100 can be provided with the second seat 103 positioned on the driver's side of the golf cart 100 and the first seat 101 positioned on the passenger's side of the golf cart 100.

Moreover, the golf cart seat 102, regardless if it is provided with both the first seat 101 and the second seat 103 or with just the second seat 103, can be configured to allow the second seat 103 to move between the driver's side of the golf cart 100 and the passenger's side of the golf cart 100. For example, when the golf cart seat 102 is provided with both the first seat 101 and the second seat 103, the first seat 101 can be configured to be removed from the golf cart 100 and interchanged with the second seat 103, that is, the first seat 101 can be unattached from the driver's side of golf cart 100 and reattached to the passenger side of the golf cart 100.

As can be appreciated, one or more modifications may need to be made to the golf cart 100 and/or the golf cart seat 102 in order for the second seat 103 to move from the driver's side of the golf cart 100 to the passenger's side of the golf cart 100, and vice versa. For example, a second rack and pinion system (and/or linkage system) may connected to the powered linear actuator to allow the second seat 103 to move from the driver's side of the golf cart 100 and the passenger's side of the golf cart 100.

Moreover, while the golf cart seat 102 has been described including a single powered linear actuator 122 which connects to the rack and pinion system 124 and the four-bar linkage system 126, the present invention is not so limited, as more than one powered linear actuator 122 can be used. For example, a first powered linear actuator can be connected to the rack and pinion system 124 and a second powered linear actuator can be connected to the four-bar linkage system 126.

Further, one or more motors, hydraulic systems, balloons, or other suitable devices may be used in conjunction with the powered linear actuator 122, the rack and pinion system 124, and the four-bar linkage system 126 to move the second seat 103 in a manner as herein described.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A golf cart comprising:
   a first seat; and
   a second seat that is movable relative to the first seat and the golf cart from a first configuration to a second configuration for moving a user of the second seat outwardly and upwardly from the golf cart from a driving position to a golfing position,
   wherein the first seat and the second seat are removably connectable to the golf cart such that the first seat and the second seat can be interchanged with each other.

2. The golf cart according to claim 1, wherein the second seat comprises a harness system including a plurality of harnesses including a first harness and a second harness that is configured to secure a user's legs to the second seat and a third harness that is configured to secure a user's torso to the second seat.

3. The golf cart according to claim 1, wherein the second seat comprises a footrest.

4. The golf cart according to claim 1, wherein the second seat comprises an adjustment mechanism that is configured to adjust a height and depth of the second seat.

5. The golf cart according to claim 1, wherein the golf cart further comprises a powered linear actuator that is connected to a rack and pinion system and a four-bar linkage system for moving the second seat from the first configuration to the second configuration.

6. The golf cart according to claim 5, wherein the golf cart further comprises an actuation mechanism that controls the powered linear actuator for moving the second seat between the first configuration and the second configuration.

7. The golf cart according to claim 6, wherein the actuation mechanism is disposed on the second seat.

8. The golf cart according to claim 1, wherein the first seat and the second seat are in electrical and mechanical communication with the golf cart when the first seat and the second seat are connected thereto for moving the second seat from the first configuration to the second configuration.

9. A two-passenger golf cart seat that is configured to connect to a golf cart, the golf cart seat comprising:
   a mode selection switch for changing the golf cart from a first mode for driving from a tee to a green to a second mode for driving on the green;
   a first seat; and
   a second seat that is movable relative to the first seat and the golf cart from a first configuration to a second configuration for moving a user of the second seat outwardly and upwardly from the golf cart from a driving position to a golfing position,
   wherein the first seat is interchangeable with the second seat.

10. The golf cart seat according to claim 9, wherein the second seat comprises a harness system including a plurality of harnesses including a first harness and a second harness that is configured to secure a user's legs to the second seat and a third harness that is configured to secure a user's torso to the second seat.

11. The golf car seat according to claim 9, wherein the second seat comprises a footrest.

12. The golf cart seat according to claim 9, wherein the second seat comprises an adjustment mechanism that is configured to adjust a height and depth of the second seat.

13. The golf cart seat according to claim 9, wherein the golf seat further comprises a powered linear actuator that is connected to a rack and pinion system and a four-bar linkage system for moving the second seat from the first configuration to the second configuration.

14. The golf cart seat according to claim 13, wherein the golf seat further comprises an actuation mechanism that controls the powered linear actuator for moving the second seat between the first configuration and the second configuration.

15. The golf cart seat according to claim 14, wherein the actuation mechanism is disposed on the second seat.

* * * * *